United States Patent
Yang

(10) Patent No.: US 6,850,667 B2
(45) Date of Patent: Feb. 1, 2005

(54) INCOMING LIGHT CONVERGENCE AND LIGHT GUIDED REFLECTION DISPLAY DEVICE

(76) Inventor: Tai-Her Yang, No. 59, Chung Hsing 8 St., Si-Hu Town, Dzan-Hwa (TW)

( * ) Notice: Subject to any disclaimer, the term of this patent is extended or adjusted under 35 U.S.C. 154(b) by 0 days.

(21) Appl. No.: 09/991,961

(22) Filed: Nov. 26, 2001

(65) Prior Publication Data

US 2003/0099435 A1 May 29, 2003

(51) Int. Cl.⁷ .................................... G02B 6/06
(52) U.S. Cl. .................... 385/33; 385/901; 385/116; 362/551; 362/554; 362/559
(58) Field of Search ................ 385/115–121, 901, 385/33–35; 362/551, 554, 561, 559, 812, 556, 560; 40/561, 562, 541, 547

(56) References Cited

U.S. PATENT DOCUMENTS

| | | | | |
|---|---|---|---|---|
| 3,780,722 A | * | 12/1973 | Swet | 126/680 |
| 3,801,187 A | * | 4/1974 | McMichael | 359/503 |
| 3,895,856 A | * | 7/1975 | Bickel | 40/561 |
| 4,201,197 A | * | 5/1980 | Dismer | 126/600 |
| 4,297,000 A | * | 10/1981 | Fries | 362/557 |
| 5,479,276 A | * | 12/1995 | Herbermann | 349/5 |
| 6,195,016 B1 | * | 2/2001 | Shankle et al. | 340/815.42 |
| 6,236,792 B1 | * | 5/2001 | Fung | 385/115 |

FOREIGN PATENT DOCUMENTS

| | | | | | |
|---|---|---|---|---|---|
| JP | 04020990 A | * | 1/1992 | | G09F/13/20 |
| JP | 06274112 A | * | 9/1994 | | G09F/13/00 |
| JP | 08253916 A | * | 10/1996 | | E01F/9/00 |

* cited by examiner

Primary Examiner—Hemang Sanghavi
Assistant Examiner—Scott Alan Knauss
(74) Attorney, Agent, or Firm—Bacon & Thomas, PLLC

(57) ABSTRACT

A device uses a convex or concave lens to converge incoming (background) light and project brighter light beams to the end of a light guide device, which then produces from its other end a light reflection in one or multiple directions for text or pattern display.

9 Claims, 2 Drawing Sheets

INCOMING LIGHT CONVERGENCE AND LIGHT GUIDED REFLECTION DISPLAY DEVICE

BACKGROUND OF THE INVENTION (a) Field of the Invention

The present invention relates to a display device, and more particularly, to one that has a focusing convex lens or a reflection concave lens to converge incoming light from multiple directions (i.e., background light) into beams. The brighter light is projected into one end of a light guide device, then reflected from the other end to produce optical reflection in one or multiple directions to display text or patterns.

(b) Description of the Prior Art

The conventional display by reflection is made through a coating or a surface capable of reflecting geometric forms to reflect the incoming light for display.

SUMMARY OF THE INVENTION

The primary purpose of the present invention is to provide a device to converge and guide incoming light from multiple directions for reflection to display text or patterns. To achieve this purpose, a focusing convex lens or a reflection concave lens is used to converge the incoming light into beams. The brighter light is projected into one end of a light guide device, then reflected from the other end to produce, in one or multiple directions, optical reflections that display the text or patterns.

DETAILED DESCRIPTION OF THE PREFERRED EMBODIMENTS

The present invention is a device that converges and reflects incoming multi-directional, ambient light through a light-guiding device for display. According to the invention, a light convergence device comprised of a convergence convex lens or a reflection concave lens is used to converge the incoming light into light beams. Brighter light beams then are projected into one end of a light guide device and reflected from the other end in one or multiple directions to display text or patterns.

Figure 1:
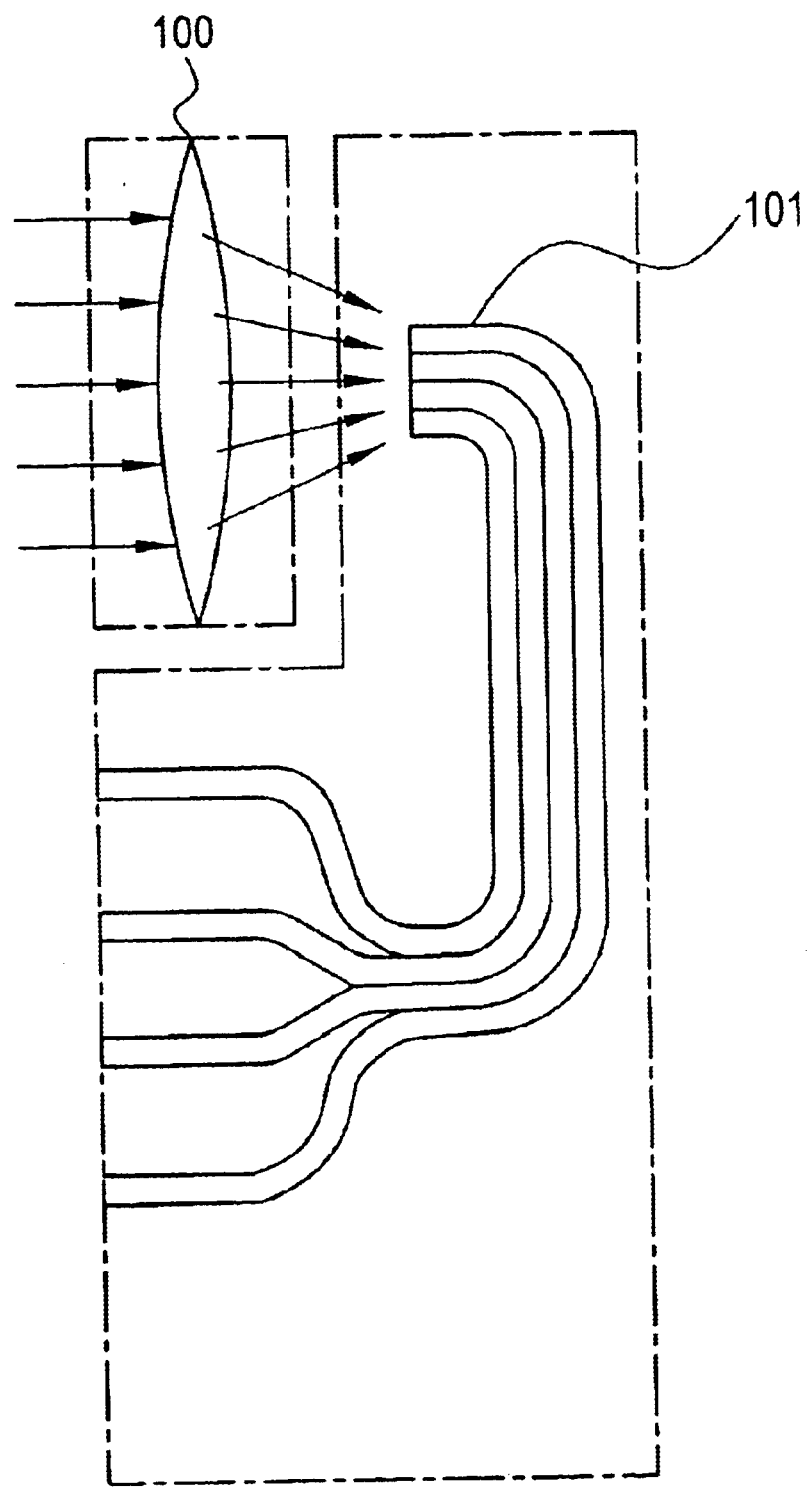
FIG. 1 is a block chart showing a structure of a display device of the present invention operating by converging and guiding light to reflect for display.

Referring to FIG. 1, in addition to a suspension or support structure, the display device of the present invention is essentially comprised of:

a light convergence device 100 including one or more convergence convex lens or reflection concave lens units subject to light incident on a front of the device and coming from one or multiple directions so to converge and intensify the light from a selected direction before the light is projected to one end of a light guide device 101 and reflected from the other end of the light guide device 101 to display selected text or patterns so that the selected text or patterns are visible from the front of the device; and a light guide device 101 including a reflection mirror or light guide fiber arranged to receive light beams intensified and outputted by the light convergence device 100 when exposed to a light source, and then to project the light in one or multiple directions either by the light guide device 101 or by means of a rectification mask to produce light reflection with brighter light beams for displaying the selected text or patterns at the front of the device.

As required, the light convergence device 100 may be provided in one or more than one directions, and identical or difference texts or patterns displayed by the light guide device 101 may be selected for display by the display device, which operates by converging and guiding the incoming light for reflection.

Alternatively, the light guide device 101 may be programmed for continuous light reflection to display identical or different texts or patterns by changing an incidence angle of light in relation to the light convergence device 100, and by programming the light projection location, texts and patterns from the aspect of display in relation to the light guide device 101.

Figure 2:
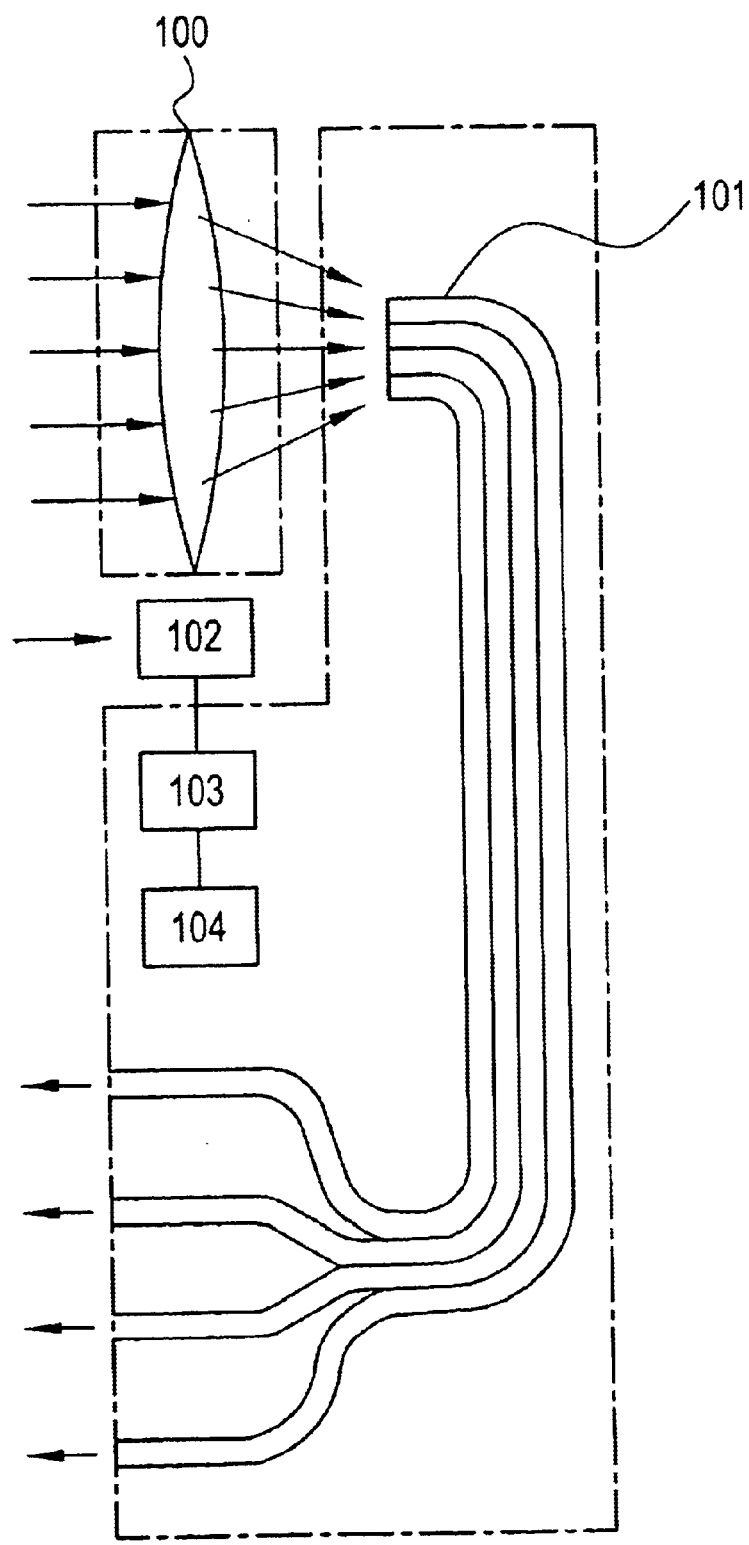
FIG. 2 is a schematic diagram showing that a structure of the present invention is applied in combination with another device that converts power into optical energy for a mixed display.

FIG. 2 shows a circuit block chart of a structure of the present invention in combination with another display device operating by converting power into optical energy. As illustrated, the combined application includes the display device and a solar cell that converts optical energy into power, or a windmill power generation device or a city power source, and a secondary source 104 comprised of an optional storage device. The combined application provides the following auxiliary functions:

(1) A control circuit device 102 for controlling light according to the present invention drives an auxiliary device 103 which converts power into optical energy for display when the background light becomes dim, the auxiliary device 103 being immediately cut off once the background light brightens. The auxiliary display device 103 can be operated and controlled for continuous display when the present invention is exposed to incoming light. The auxiliary display device 103 when driven by the incoming light executes display of text or patterns and control of time-delay periodical cutoff to achieve a mixed display that combines an auxiliary display with the text or pattern display produced by reflecting the light through the light guide device 101, where the incoming light is converged and intensified; or (2) The device that converges and guides the incoming light to reflect for display may be provided with a light activated auxiliary power source to drive another display device that converts power into optical energy for text or pattern display or audio signal transmission; or (3) The device that converges and guides the incoming light to reflect for display may be provided with an optical conversion device to convert the incoming light into power that can be charged into a storage device as a stand-by to drive the device that converts power into optical energy for display, or to drive an audio signal transmission device.

The present invention, by converging and intensifying incoming light, and reflecting the converged and intensified light to display text or patterns through a light guide device offers better results and a brighter display than that does the direct reflection of the prior art.

What is claimed is:

1. A display device that utilizes background light incident on a front of the display device, comprising:

a light guide device having first and second ends, each of which faces the front of the display device, said second end being arranged to reflect light and thereby form text or a pattern visible from the front of the display device; and a light convergence device for converging incoming background light from multiple directions and intensifying the incoming background light before projection to said first end of said light guide device, wherein said light guide device includes at least one optical fiber.

2. A display device as claimed in claim 1, wherein said convergence device includes a convex lens.

3. A display device as claimed in claim 1, wherein said convergence device includes a concave reflector.

4. A display device as claimed in claim 1, wherein said light guide device includes a reflective mirror arrangement.

5. A display device as claimed in claim 1, further comprising a rectification mask at said second end of said light guide device for producing said text or pattern.

6. A display device as claimed in claim 1, further comprising a control circuit and an auxiliary display device including a powered light source, wherein said control circuit causes said auxiliary display device to convert power into optical energy when said background light is dim, and further causes said auxiliary display device to cut off when said background light becomes bright.

7. A display device as claimed in claim 1, further comprising an optical conversion device for converting said incoming background light into power that is charged into a power storage device, and an auxiliary display device that converts power stored in said storage device to optical energy when said background light is dim.

8. A display device that utilizes background light incident on a front of the display device, comprising:

a light guide device having first and second ends, each of which faces the front of the display device, said second end being arranged to reflect light and thereby form text or a pattern visible from the front of the display device;

a light convergence device for converting incoming background light from multiple directions and intensifying the incoming background light before projection to said first end of said light guide device; and a light-activated auxiliary power source for driving another display device that converts power into optical energy to supplement the background-light driven light convergence device.

9. A display device that utilizes background light, comprising:

a light guide device having first and second ends, said second end being arranged to reflect light and thereby form text or a pattern; and a light convergence device for converging incoming background light from multiple directions and intensifying the incoming background light before projection to said first end of said light guide device;

an optical conversion device for converting said incoming background light into power that is charged into a power storage device; and an auxiliary display device that converts power stored in said storage device to optical energy when said ground light is dim, wherein said power storage device further powers an audio signal transmission device as required.

* * * * *